Aug. 27, 1935. L. D. MILLER 2,012,792
TOOL HANDLE
Filed Nov. 6, 1933
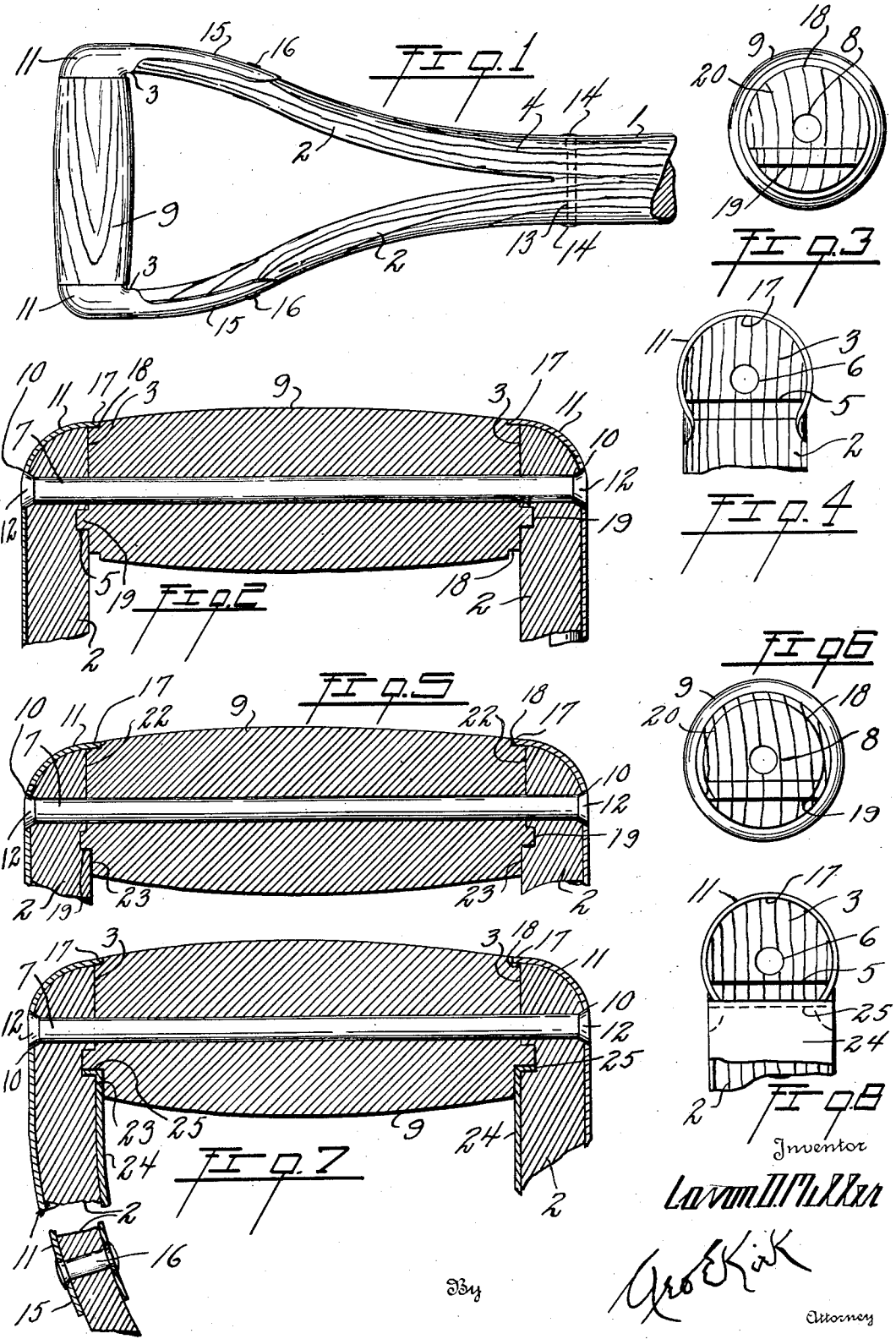

Patented Aug. 27, 1935

2,012,792

UNITED STATES PATENT OFFICE 2,012,792

TOOL HANDLE

Lavon D. Miller, Hicksville, Ohio

Application November 6, 1933, Serial No. 696,903

1 Claim. (Cl. 294—57)

This invention relates to grips or handles, especially of the D-types for tools.

This invention has utility when incorporated in wood cob and fork handles and the anchoring assembly thereof.

Referring to the drawing:

Fig. 1 is a side view of an embodiment of the invention in a handle such as for spades, shovels, forks and the like;

Fig. 2 is an enlarged view in section of the cob and fork assembly in the handle of Fig. 1;

Fig. 3 is an end elevation of the cob or grip of the handle of Fig. 1;

Fig. 4 is a view from the inside looking at the free end of a fork of the handle of Fig. 1, which has the trim in position therewith;

Fig. 5 is a view similar to Fig. 2 with the faces on opposite sides of the tongue of different depth;

Fig. 6 is an end view of the cob of Fig. 5;

Fig. 7 is a view similar to Fig. 5 with a supplemental or companion trim inside the fork; and Fig. 8 is an end view of the free end of the fork of Fig. 7.

Wood handle 1 has forks 2 spread to have opposing parallel free end portions 3 with grain 4 of the wood extending longitudinally of the handle 1 and forks 2. This free end has transversely thereof groove 5 crosswise of the grain 4. Opening 6 is for rivet or pin 7 to extend through the opening 6 in the free ends of the respective forks as well as through opening 8 in cob 9.

This pin 7 also extends through openings 10 in trims 11 and is anchored therewith by heads 12 on the ends of this pin 7. Parallel with this pin 7 is rivet 13 having heads 14. This pin 13 extends through the handle 1 near the root of the fork. The trim 11 has extension 15 along the outer portion of the free end of the forks 2 and is assembled by rivet 16 through the fork. This assembly supplements the assembly of the pin 7.

This trim 11 has overhang 17 into reduced diameter portion 18 of the cob 9, thus giving a finish between the free ends of the forks 2 and the grip of the cob 9. This cob 9 is herein shown provided with tongue 19 at wood end grain 20 of the cob 9. There is accordingly, at this tongue an extension of wood end grain portions of this tongue 9 into the groove 5 of the fork free ends. This tongue-groove connection is for shearing action as to the tongue 19 transversely of the extent of the grain of the cob and is held by end grain portions of the grain 4 in the free end of the fork. There is thus, in this assembly as held by the pin 7, a firm anchoring of the cob with the fork of the handle. This anchoring is against any free rotation and is against any strains being distributed which might tend to split the grain. The keying is positive and introduces no weakening factor.

In the disclosure in Fig. 5, inner face 22 of the free end of the fork 2 on one side of the tongue 19 is nearer the free end of such tongue 19 than is face 23. As thus assembled, the reduced diameter portion 18 extends only from the lower face of the tongue 19 around that portion of the cob upon the opposite side of the pin 7.

In the showing in Fig. 7, besides the trim 11, there is opposing inner trim 24 coacting with the face 23 and having offset terminus 25 at the groove 5 providing a metal seat for one side of the tongue 5. This supplemental or inner trim 24 as extending along the fork 2 may be further held by the pin 16 as anchoring the trim 11.

In each of these types of handles herein disclosed, the tongue and groove combination provides complementary ledge assembly keying substantial against expansion or shrinkage in maintaining the assembly for a handle of light weight and maximum strength, which resist torsion as well as thrust and pull, whether in the line of the handle extent or transversely thereto.

What is claimed and it is desired to secure by Letters Patent is:

A D-handle comprising a wood fork having a pair of diverging arms with the free ends parallel and providing a pair of opposing flat faces, said arms provided with openings therethrough adjacent the free ends and transverse grooves across the flat faces on the side inward from the openings away from the free ends, the free end sides of the grooves being of lesser depth than the opposite sides thereof, a wood cob having tongues of less thickness than the width of the grooves for assembly therewith, there being a clearance between the inner side of the grooves and the tongues and between the cob ends and the arm portions inward from the grooves, a metal trim attached to each arm inward from the cob and extending into said clearances to terminate in said grooves, said trims providing arm reinforcements inward from the grooves and wood to wood assembly of the cob and arms outwardly from the grooves, and assembly means for the cob and arms locking the outer trim termini in said grooves.

LAVON D. MILLER.